Aug. 10, 1965  H. H. GADBURY  3,199,889
TRAILER

Filed Jan. 6, 1964  2 Sheets-Sheet 2

HERBERT H. GADBURY
INVENTOR

Huebner & Worrel
ATTORNEYS

United States Patent Office 3,199,889
Patented Aug. 10, 1965

3,199,889
TRAILER
Herbert H. Gadbury, 30713 Road 76, Visalia, Calif.
Filed Jan. 6, 1964, Ser. No. 335,783
3 Claims. (Cl. 280—34)

The present invention relates to a trailer having special utility for transporting farm inplements and the like of excessive transverse dimensions and more particularly to such a trailer which is easily converted for transport of wide loads and narrowed for normal highway travel.

Farm inplements, such as scrapers, grain harvesters, hay swathers, and the like are frequently transportated by trailers on highways and country roads when the distances between fields of operation are excessive or when towing such implements is otherwise inconvenient. The width of such implements is frequently as much as eighteen to twenty feet which requires trailers of a width greater than is usually available. The unavailability of trailers of a sufficient width to accommodate such implements is due primarily to maximum vehicle and trailer width limitations existing in the laws of most states. Many of such laws, however, permit the transport of these implements and other wide loads by trailers of appropriate width as an emergency matter but do not permit travel of such trailers on the highways when empty or transporting a load of less than excessive width. Such laws seriously restrict the use and consequent availability of such wide trailers since they must stand idle while the particular implements transported thereby complete their tasks and are ready for return transport or movement to subsequent fields of operation.

Therefore, it is a broad object of the present invention to provide an improved trailer for transporting farm implements and other loads of excessive width.

Another object is to provide such a trailer of a width greater than conventional trailers but which is capable of being narrowed for legal highway travel.

Another object is to provide a trailer of adjustable width which is readily converted for use in transporting loads of excessive width and for highway travel in narrowed condition with narrow loads or empty.

Another object is to provide such a trailer which may be so converted without special tools.

Another object is to provide such a trailer for transporting loads of excessive width which may be automatically elevated to facilitate conversion between wide and narrow travel requirements.

Other objects and advantages of the present invention will subsequently become more clearly apparent upon reference to the description in the specification.

In the drawings:

FIG. 4 is a somewhat enlarged transverse vertical section showing a wheel mounting on the load carrying portion of the trailer taken generally along line 4—4 of FIG. 1.

FIG. 5 is a somewhat enlarged transverse vertical section showing an alternate wheel mounting on the draft portion of the trailer taken along line 5—5 of FIG. 1.

Figure 1:
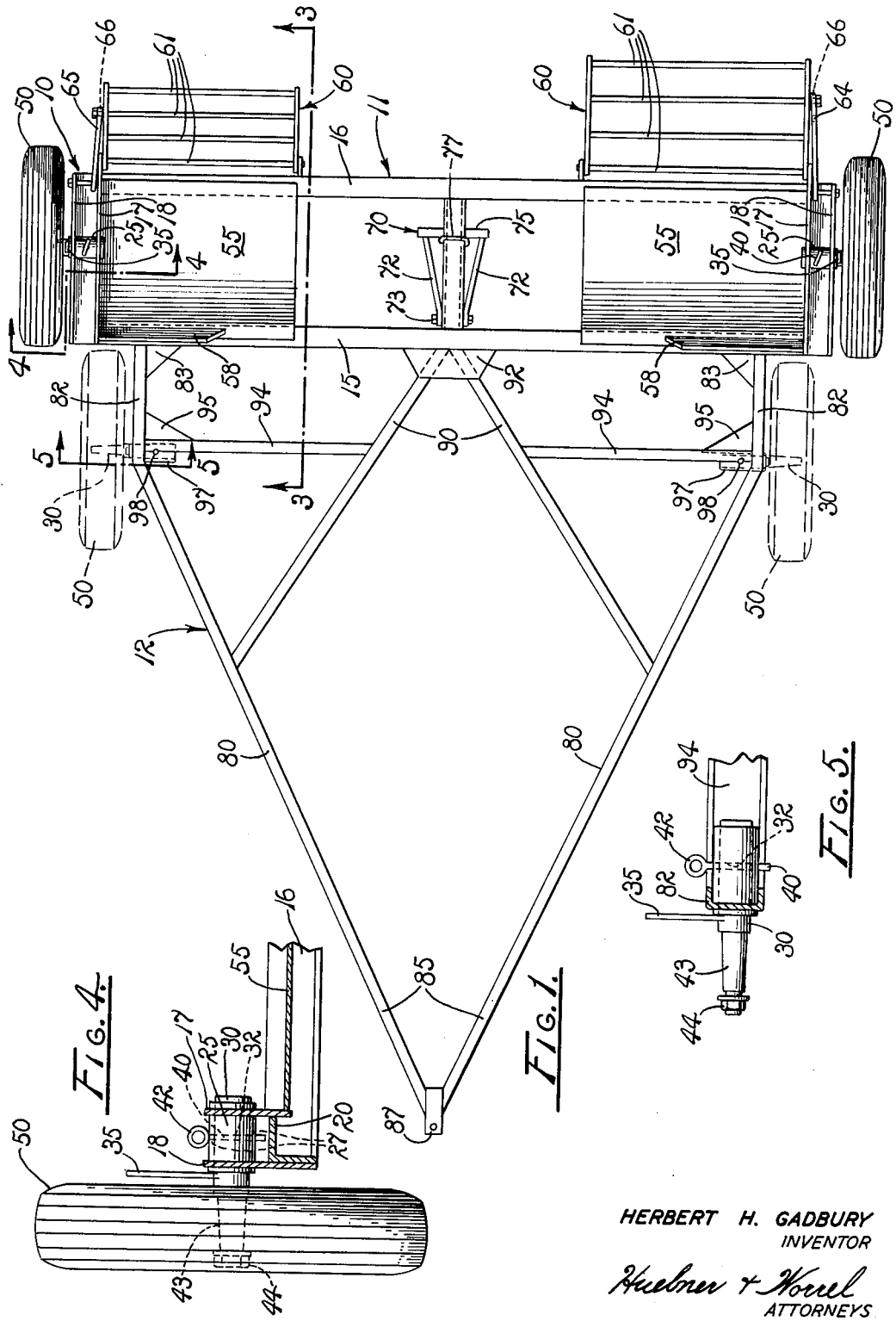
FIG. 1 is a top plan view of the trailer of the present invention showing alternate wheel positions in dashed lines.

Referring more particularly to the drawings, a trailer embodying the principles of the present invention provides a frame 10 having a transversely elongated load carrying portion 11 and a draft portion 12 symmetrically forwardly extended therefrom. The load carrying portion of the frame provides a pair of transversely extended, spaced, substantically parallel, forward and rearward, edgewardly disposed channel members 15 and 16, respectively, which are individually interconnected at their ends by opposite pairs of inner and other spaced substantially parallel side plates 17 and 18, respectively, connected to the channel members as by welding or the like. The channel members are also interconnected by an intermediate channel member 20 which is similarly secured to the forward and rearward channel members in downwardly opening position and in aligned relation with the longitudinal center line of the trailer.

A pair of elongated tubular sleeves 25 are individually mounted in the opposite pairs of side plates 17 and 18 for extension therethrough in transversely spaced coaxial relation and secured therein by welding or the like. Each of the sleeves includes transversely extended substantially vertically aligned circular openings 27 therethrough. A pair of stub axles 30, each having a transverse bore 32 therethrough, are individually slidably extendable into the sleeves 25. A handle 35 is mounted on the axles in radially extended relation therefrom in a plane substantially aligned with the bore 32 for ease of rotation of the axles within their respective sleeves precisely to align the bores with the openings 27 in the sleeves. The axles are releasably constrained to such position by elongated locking pins 40 having pull rings 42 mounted on the upper ends thereof for ease of manipulation. The axles include outwardly extended spindle portions 43 which screw threadably receive lock nuts 44. A pair of frame supporting wheel and tire assemblies 50 are rotatably mounted on the spindle portions of the stub axles and are axially constrained in frame supporting position by the lock nuts 44.

Figure 3:
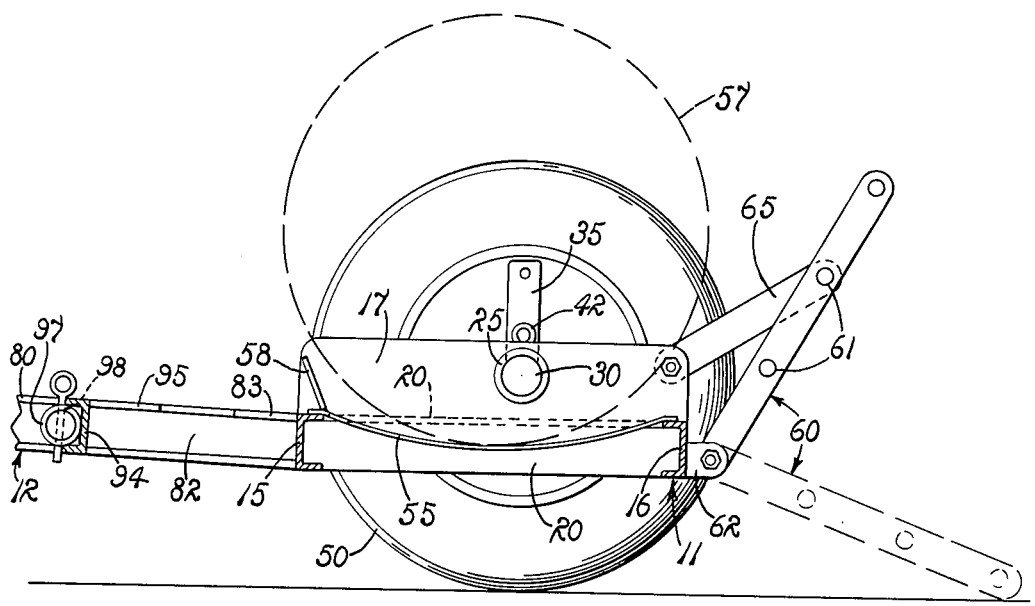
FIG. 3 is a somewhat enlarged longitudinal section through the load carrying portion of the trailer taken on line 3—2 of FIG. 1.

A pair of downwardly arcuately curved cradle-like load support plates 55 are mounted on the load carrying portion 11 of the frame 10 in transversely spaced interconnecting relation between the forward and rearward channel members 15 and 16 and are individually welded along the inner side plates 17. As best shown in FIG. 3, a wheel of an implement of excessive width, such as a grain harvester, a swather, or the like is indicated in dashed lines at 57 cradled in the load support plates 55. A pair of transversely spaced angularly forwardly and upwardly extended wheel stops 58 are individually mounted on the load support plates above the forward channel member 15 to engage and preclude forward displacement of the implement wheel 57 from the load support plates 55.

A pair of implement loading ramps 60 having a plurality of spaced substantially parallel cross rods 61 are pivotally mounted on brackets 62 rearwardly extended from the rearward channel member 16 for swinging movement between the alternate dashed line and full line positions shown in FIG. 3. In the dashed line position, the outer end of the ramp is rested upon the ground surface and in the full line position it is swung upwardly to preclude inadvertent removal of the implement from the trailer. The ramps are individually constrained in their elevated positions by elongated links 64 and 65 which are pivotally mounted on the rearward upper portion of the inner side plates 17. The outer ends of the links provide apertures 66 which receive an extended end of one of the rods 61 of the ramps. It is noted that the link 64 has a plurality of such apertures for adjusting the elevational position of the left or lowermost ramp 60, as viewed in FIG. 1, in order to accommodate certain implements which usually provide structural obstruction to the full elevational positioning of the ramp.

A trailer stand 70 is employed automatically to elevate the trailer when empty to facilitate removal of the wheel and tire assemblies 50. As best shown in FIG. 1, the stand provides a pair of transversely spaced forwardly converging legs 72 which are pivotally mounted at their forward ends on the intermediate channel member 20 of the frame 10 by a pin 73 extended therethrough. The legs are rigidly interconnected at their rearward or lower ends by a ground engaging foot member 75 secured to the legs as by welding or the like. A hook-shaped hanger rod 77 is pivotally mounted on the foot member 75 for positioning over the intermediate channel member to hold the stand in a carrying position, as shown in dashed lines in FIGS. 1 and 2.

The draft portion 12 of the frame 10 provides a pair of elongated channel members 80 which include rearward longitudinally extended end portions 82 rigidly mounted, as by welded gussets 83, on the forward channel members 15 of the load carrying portion 11 of the frame. The channel members 80 are disposed in forwardly extended relation from the load carrying portion 12 in transversely inwardly spaced substantially parallel relation to the side plates 17 and 18. The channel members 80 include elongated forwardly converging portions 85 which are interconnected by a forwardly extended clevice 87 which is adapted to be connected in any suitable manner to a hitch 88 on a tractor, truck, or other prime mover fragmentarily indicated at 89. A pair of angularly disposed braces 90 are individually secured, as by welding, to the forward portions 85 of the channel members 80 in rearwardly converging relation for connection to the forward channel member 15 along the longitudinal center line of the trailer. Such connection is preferably strengthened by welded gussets 92. A pair of transverse braces 94 are disposed between the angular braces 90 and their respective channel members 80 at the point of intersection of the forward and rearward portions thereof with the braces being strengthened by welded gussets 95. A pair of elongated tubular sleeves 97 are mounted in the channel members 80 in transversely inwardly extended relation therefrom and within the forward side of the transverse braces 94. The sleeves are transversely coaxially aligned and include transversely substantially vertically aligned openings 98 therethrough.

*Operation*

The operaton of the described embodiment of the subject invention is believed to be clearly apparent and is briefly summarized at this point. With the wheel and tire assemblies 50 disposed in their full line load carrying positions of FIG. 1, the loading ramps 60 are disconnected from their respective links 64 and 65 so that the ramps can be lowered to the dashed line ground engaging loading position of FIG. 3. After loading with the implement wheels 57 cradled in the support plates 55, the ramps are returned upwardly in blocking relation to the implement disposed on the load carrying portion 11 of the trailer by connection of the links 64 and 65 to their respective extended portions of the rods 61. It is apparent that with the wheels 50 mounted on the load carrying portion of the frame, the load will be most evenly distributed on the frame and wheels during transport of the implement.

After reaching the field of operation, the ramps 60 are again disconnected from their respective links 64 and 65 and lowered to the ground to permit unloading of the implement from the trailer. The ramps are then returned upwardly to a carrying position by connection to their respective links in the previously described manner for subsequent movement of the trailer. In order to narrow the trailer for travel on a highway, the wheel and tire assemblies 50 are moved from their full line positions on the load carrying portion of the frame to their dashed line, inwardly spaced positions of FIG. 1.

Figure 2:
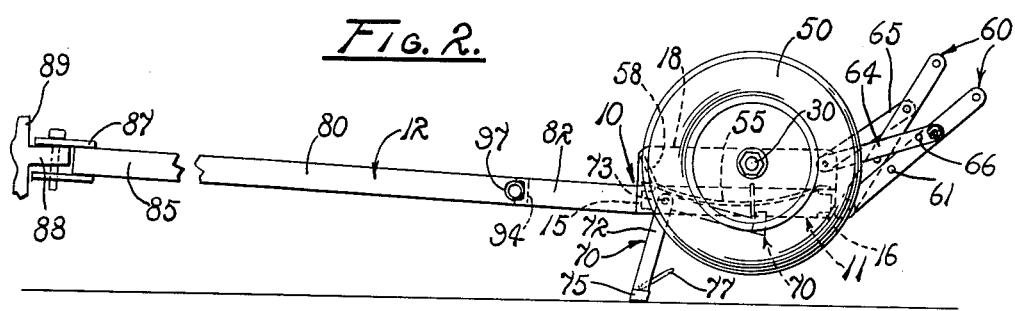
FIG. 2 is a side elevation of the trailer shown in FIG. 1 connected to a fragmentary representation of a powered vehicle and showing a stand in elevating relation to the trailer.

Such conversion is easily accomplished by unhooking the hanger rod 77 from the intermediate channel member 20 to permit the stand 70 to swing downwardly against the ground. The prime mover vehicle 89 is then backed to move the trailer rearwardly for automatic elevation upon the stand 70. Such movement is limited by abutment of the arms 72 of the stand with the forward channel member 15, as shown in FIG. 2. With the trailer so elevated, the lock pins 40 are removed from the openings 27 and bore 32 of the sleeves 25 and the stub axles 30, respectively, to permit withdrawal of the axles from the sleeves. After withdrawal the axles 30 of the wheel and tire assemblies 50 are inserted into the sleeves 97 on the draft portion 12 of the frame 10. The handles 35 are employed to rotate the axles within the sleeves so as accurately to align the bores 32 in the axles with the openings 98 in the sleeves to permit unrestricted insertion of the lock pins 40. With such mounting, the wheels are disposed transversely inwardly of the outer side plates 17 of the load carrying portion of the frame which represent an overall trailer width corresponding to the maximum legal limits for highway travel of the trailer when empty or with a narrow load. The prime mover is operated to move the trailer forwardly off of the stand 70 and onto the wheel and tire assemblies 50. With the trailer supported on the wheels, the stand is swung upwardly to its carrying position on the frame with the hanger rod 77 hooked over the intermediate channel member 20.

In view of the foregoing, it is readily apparent that the structure of the present invention has provided an improved trailer which is easily converted from a wide load carrying condition to an empty or narrow load carrying condition. The trailer, however, it of a sufficient width to accommodate unusually wide loads thereon which, when conditioned for transporting such loads, permits the wheels of the trailer to be located for optimum distribution of the load on the trailer. The trailer is automatically elevated to facilitate interchange of the wheels during conversion of the trailer which is easily accomplished by manipulation of the locking pins 40 without the use of special elevating jacks or wheel pulling tools.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A trailer adapted to be drawn by a powered vehicle comprising a frame having a draft portion providing a tongue connectable to such a vehicle and a load carrying portion having opposite side members transversely outwardly extended from the draft portion, a pair of opposite ground engaging frame support wheels, a pair of stub axles individually rotatably mounting the wheels, a pair of first sleeve members individually mounted in said side members of the load carrying portion in transversely spaced axially aligned relation individually to receive said axles for mounting the wheels in ground engaging relation transversely outwardly of the side members of the load carrying portion of the frame, and a second pair of sleeve members mounted on said draft portion of the frame in transversely spaced axially aligned relation and spaced parallel relation to the axis of the first pair of sleeves and transversely inwardly disposed therefrom, said second pair of sleeves interchangeably receiving said stub axles for alternately mounting the wheels in ground engaging relation transversely inwardly of said mounting on the load carrying portion of the frame thereby to reduce the width of the trailer.

2. A trailer adapted to be drawn by a powered vehicle comprising a frame having a draft portion providing a tongue connectable to such a vehicle and a load carrying portion having opposite side members transversely outwardly extended from the draft portion; a pair of opposite ground engaging frame support wheels; a pair of stub axles individually rotatably mounting the wheels with each of the axles having a transversely disposed bore therethrough; a pair of first sleeve members individually mounted in said side members of the load carrying portion of the frame in transversely spaced axially aligned relation individually to receive said axles for mounting the wheels in ground engaging relation transversely outwardly of the side members of the load carying portion of the frame and having transversely aligned openings therethrough registrable with said bores in the axles; a second pair of sleeve members mounted on said draft portion of the frame in transversely spaced axially aligned relation in spaced parallel relation to the axis of the first pair of sleeves and tranversely inwardly disposed therefrom, said second pair of sleeves interchangeably receiving said stub axles and having transversely aligned openings registrable with said bore in the axles for alternately mounting the wheels in ground engaging relation transversely inwardly of said mounting on the load carrying portion of the frame thereby to reduce the width of the trailer; and locking means insertable through said openings in the sleeve and through said bore in the axles to hold the wheels in said alternate positions.

3. A trailer adapted to be drawn by a powered vehicle comprising a frame having a draft portion providing a togue connectable to such a vehicle and a load carrying portion having opposite sides members transversely outwardly extended from the draft portion; a pair of opposite ground engaging frame support wheels; a pair of stub axles individually rotatably mounting the wheels with each of the axles having a transversely disposed bore therethrough; a pair of first sleeve members individually mounted in said side members of the load carrying portion in transversely spaced axially aligned relation adapted individually to receive said axles for mounting the wheels in ground engaging frame supporting relation transversely outwardly of the side members of the load carrying portion of the frame and having transversely aligned openings therethrough registrable with said bores in the axles; and a second pair of sleeve members mounted on said draft portion of the frame in transversely spaced axially aligned relation in spaced parallel relation to the axes of the first pair of sleeves and transversely inwardly therefrom, said second pair of sleeves interchangeably receiving said stub axles from the first sleeves and having transversely aligned openings registrable with said bores in the axles for alternately mounting the wheels in ground engaging frame supporting relation transversely inwardly of said mounting on the load carrying portion of the frame thereby to reduce the width of the trailer; a pair of lock pins individually insertable through said openings in the sleeve and through said bores in the axles to hold the wheels in said alternate positions; and elevating means pivotally mounted on the frame for movement between a carrying position on the frame and a ground engaging position for automatically elevating the frame to facilitate said interchange of wheels between their alternate positions.

References Cited by the Examiner
UNITED STATES PATENTS

| | | | |
|---|---|---|---|
| 2,351,830 | 6/44 | Mitchell et al. | 280—34 X |
| 2,541,582 | 2/51 | Hawkins | 280—402 |
| 2,594,540 | 4/52 | Cole et al. | 280—34 X |
| 2,736,567 | 2/56 | McMurray | 280—34 |
| 2,832,607 | 4/58 | Kramer | 280—63 |

ARTHUR L. LA POINT, *Primary Examiner.*